Nov. 21, 1950       R. H. LEHDE       2,531,138
TIMING APPARATUS
Filed March 9, 1949
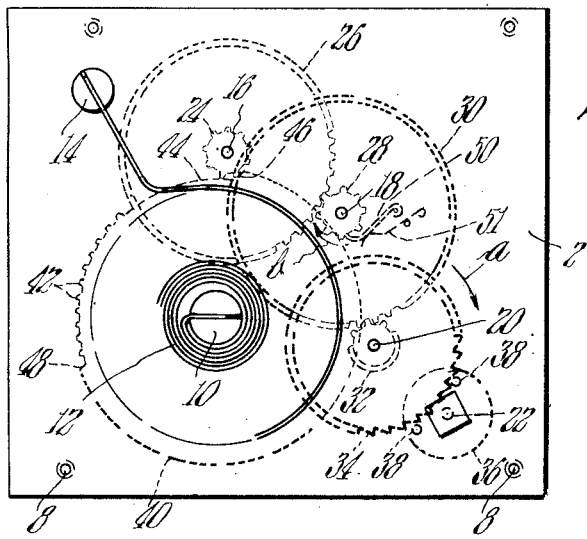
Inventor
Richard H. Lehde
By Ross & Ross
Attorney

Patented Nov. 21, 1950

2,531,138

UNITED STATES PATENT OFFICE 2,531,138

TIMING APPARATUS

Richard H. Lehde, West Hartford, Conn.

Application March 9, 1949, Serial No. 80,516

6 Claims. (Cl. 161—1)

My invention relates to improvements in a timing device having particular adaptability in the field of automatically timed electrical cooking apparatus and the like.

As a result of my invention there is provided an apparatus for creating a timing cycle or cycles for an apparatus of the type above described which is different, unique and more efficient as compared with prior art apparatus.

To illustrate a practical use of the device of my invention, it is well accepted that in an electric bread toaster the time required to toast a slice of bread to a predetermined or desired degree varies with the variations in the temperature condition of the toaster. That is to say, if a fixed time interval is used, successive slices of toast will be progressively darker. It takes a relatively greater amount of time to toast a first slice of bread to a predetermined degree upon insertion into a cold toaster than is required to toast a subsequent bread slice or slices. In other words, to provide uniform toasting, it is necessary that the time interval for the operation of the toaster be made shorter when the toaster is heated.

In order to achieve the desired results, such as required in the illustration recited above, I provide a means for varying amount of time to toast a first slice of bread to a predetermined degree upon insertion into a cold toaster than is required to toast a subsequent bread slice or slices. In other words, to provide uniform toasting, it is necessary that the time interval for the operation of the toaster be made shorter when the toaster is heated.

In order to achieve the desired results, such as required in the illustration recited above, I provide a means for varying the time cycle in accordance with various varying factors so as to compensate for the changes in temperature occasioned by the use of the device with which it is associated.

Various other attempts have been made to overcome this objection but have not been entirely satisfactory.

In one way, the timing has been accomplished by a spring motor including a gear train and escapement with means, operable on the escapement according to the temperature, to control the operation or time cycle thereof thereby to vary the toasting time.

This and other prior art devices not only are expensive to produce but also are not entirely satisfactory in their operation.

According to my invention, a timing mechanism is provided which includes a driving member that is operable through a gear train to actuate an escapement. The driving member is formed from bi-metal which, when heated, drives with an increased power or speed. The escapement is capable of varying speed whereby when the driving member is cool, the timed cycle is of a longer duration than when the driving member is warm or hot.

During the toasting cycle, the driving means is heated by various means so that its power or unwinding speed is increased whereby the escapement operates at an increased speed. Thus, as the toaster becomes heated, the toasting cycle is shortened, the toasting cycle being related to the temperature of the toaster.

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawings wherein:

Figs. 1 and 2 are plan and side elevational views respectively showing a timing device embodying the novel features of my invention;

Fig. 3 is a wiring diagram to explain the operation of my timing device; and

Fig. 4 is a side elevational view of a toaster for a further explanation of my invention.

Referring now to the drawings more in detail, the embodiment therein comprises a support 2 which includes upper and lower plates 4 and 6 secured together by posts 8 in the usual manner and as may best be observed by reference to Fig. 2.

A drive shaft 10 is journalled in the support 2. The inner end of a drive member 12 is secured to the upper end of the shaft 10 in a suitable manner such as is shown in Fig. 1, the said member being spirally arranged similarly to a clock spring.

The outer end of member 12 is anchored to a post 14 secured to the plate 4. In some cases it may be desirable to provide for movement of member 14 relative to the axis of shaft 10 thereby to change or vary the action of member 12.

Shafts 16, 18 and 20 are journalled in the support 2 as is a staff 22. The shaft 16 has a pinion 24 and a gear 26 fixed thereto which is in mesh with a pinion 28 rotatable on shaft 18.

The shaft 18 also has a gear 30 fixed thereto which is in mesh with a pinion 32 on a shaft 20.

A ratchet wheel 34 is fixed on shaft 20 and a balance disc 36 on staff 22 has pins 38 extending upwardly therefrom. The wheel 34 and balance disc 36 are so arranged that when power is applied to the ratchet wheel 34 to rotate it in the direction of arrow "a," the balance disc 36 is oscillated by the teeth of the member 34 engaging and disengaging the pins 38 of the member 36.

The ratchet and disc provide an escapement adapted and arranged for operating at variable speeds. That is to say, the escapement is adapted for increased operating speeds as increased power or speed is applied thereto.

As shown in Fig. 1, a pawl 50 is pivoted on gear 30 and is urged by spring 51 into engagement with pinion 28 which is rotatable on shaft 28.

As shaft 10 is rotated in a clockwise direction from the position shown in Fig. 1, gear 26 is rotated in a counterclockwise direction so that pinion 28 is rotated thereby in a clockwise direction, the teeth of pinion 28 passing by the pawl 50.

When the gear 26 rotates in an opposite (clockwise) direction the gear 30 is rotated by pinion 28 because the pawl 50 is engaged in the teeth of the pinion 28.

Thus as will be observed, motion is not imparted to the ratchet 34 when pinion 28 rotates clockwise. Motion, however, is imparted to the ratchet 34 when said pinion rotates counter clockwise.

A member 40 is fixed to drive shaft 10 which has a plurality of teeth 42 on its peripheral edge for engaging pinion 24. The member 40 also has a blank peripheral portion 44 and stops 46 and 48 which engage the pinion 24 as member 40 is rotated. There may be a lever 54 secured to the shaft 10 engageable with means or mechanism to function as stopping means, to limit, as do the stops, the angle of movement of shaft 16.

Shaft 10 may be operated by such means as crank 54 or operating lever.

The drive member 12 according to the invention will be formed from bi-metal and has the ability to assume a wound condition when cold or at a temperature below a toasting temperature, say room temperature, while it unwinds when subjected to elevated temperature. As the temperature of the member 12 is progressively increased the escapement operates at increasing speeds. This is due to said member unwinding at an increased rate or providing more driving power or both.

As stated, the mechanism, among other uses, is particularly adapted for use in a toaster such as, represented by T in Fig. 4. Such a toaster has a member 60 which is depressable in the well known manner to put the toaster into operation.

In Fig. 3, there is shown a diagram to explain the mode of operation of my device.

Connections 72 and 74 extend to the contact 69 and the resistance 66 which is connected by 76 to a resistance 78 which is also connected by 80 to switch arm 68. 64 represents a power line.

For the practice of the invention the member 12 may be heated by the prevailing heat in the toaster brought about by resistance 66, or it may be heated by resistance 78. In another way the member 12 may be connected in the circuit so that it is heated, as shown.

A rod 70 or the like operable by member 60 has a member 82 thereon which is connected to switch arm 68 so that when member 60 is depressed the switch is closed for energizing resistance 66. The member 72 may also act on lever 64 when depressed to swing it downwardly to cold from hot upper position.

It will be assumed that the toaster is cold so that the member 12 is in a suitably wound up condition with lever 64 in the lower cold position shown in Fig. 3.

As member 60 is depressed switch 68 is closed, for an initial toasting operation. The circuit is closed for energizing resistance 66 which heats for toasting and heat is applied to member 12 in one of the ways described.

Heat causes member 12 to unwind, shaft 10 rotates counter clockwise, the smooth periphery of gear 40 passes pinion 24 during which period the escapement is inoperative. As teeth 42 of member 40 engage pinion 24 during its counterclockwise rotation the escapement is operated, member 12 becomes heated and in unwinding lever 54 moves to its upper hot position and on swinging upwardly it engages member 72 of rod 70 so as to open switch 68.

The member 12 because of being heated will now operate the escapement at increased speed due to its ability to either unwind at a faster speed or exert increased power.

With member 12 thus in heated condition as member 60 is depressed for a subsequent toasting operation member 72 engages lever 64 and moves it downwardly so that shaft 10 turns counterclockwise to wind up member 12 against its increased tendency to unwind.

Thus in this subsequent toasting operation the member 12 possessing an increased tendency to unwind due to heating thereof and winding operates the escapement at an increased speed thereby reducing the timed toasting cycle.

By means of the invention the interval of time for a subsequent cycle of operation, as in a toaster, is reduced over an initial or previous cycle to the end that uniform results are obtained.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. Timing apparatus operable through an initial cycle and a subsequent cycle of increased duration comprising in combination, a coiled driving member adapted to unwind with increasing speed when subjected to increasing temperature, an escapement adapted to operate from slow to relatively faster speed, a gear train operatively connected at one end to said escapement, means connecting the opposite end of said gear train, said gear train including means adapted as said drive member is wound for disconnecting said drive member and escapement.

2. Timing apparatus operable through an initial cycle and a subsequent cycle of increased duration comprising in combination, a coiled driving member formed from bi-metal adapted to unwind with increasing speed when subjected to increasing temperature, an escapement adapted to operate from slow to relatively faster speed, a gear train operatively connected at one end to said escapement, means connecting the opposite end of said gear train, said gear train including means adapted as said drive member is wound for disconnecting said drive member and escapement.

3. Timing apparatus operable through an initial cycle and a subsequent cycle of increased duration comprising in combination, a coiled driving member from bi-metal adapted to unwind with increasing speed when subjected to increasing temperature, an escapement adapted to operate from slow to relatively faster speed, a gear train operatively connected at one end to said escapement, means connecting the opposite end of said gear train, said gear train including means adapted as said drive member is wound for disconnecting said drive member and escapement, said means including releasably engaging means carried by said gear train.

4. A timing device adapted for operation through a predetermined interval comprising in combination, supporting means, a drive shaft rotatable in said supporting means, a coiled drive member having opposite ends secured to said shaft and said supporting means and adapted to unwind and rotate said drive shaft with increasing speed as the temperature thereof is increased, an escapement adapted to accelerate from low to relatively high speed, a drive gear on said drive shaft, a gear train operatively connected to said escapement having a driven gear, said gear train being arranged and adapted for non-engagement as said drive shaft is rotated for winding said spring and for operative engagement as said spring unwinds whereby said escapement is actuated, a source of electrical energy, a heating element operable by said drive shaft, and a circuit including a switch.

5. Apparatus of the class described comprising in combination, a drive shaft, a coiled drive member having an end secured thereto and adapted on being heated to unwind and actuate an escapement at a faster speed than when unheated, an escapement adapted for operation at various speeds, a train of gears operatively connected at one end to said escapement, a drive gear on said shaft operatively connected to the opposite end of said train of gears, said gear train including means whereby as said drive member unwinds said escapement is operated thereby while when said member is being wound up said escapement is unoperative thereby, heating means including a source of electrical energy and a resistance connected in a circuit with a switch, a manually movable operating member, and connections between said member, drive member and switch arranged and adapted whereby when the drive member is cold and the operating member is moved in one direction said switch is closed and said drive member is heated so that it unwinds and brings about opening of said switch and on moving said member subsequently said switch is closed and said drive member is wound.

6. Apparatus of the class described comprising in combination, a drive shaft, a coiled drive member formed from bi-metal having an end secured thereto and adapted on being heated to unwind and actuate an escapement at a faster speed than when unheated, an escapement adapted for operation at various speeds, a train of gears operatively connected at one end to said escapement, a drive gear on said shaft operatively connected to the opposite end of said train of gears, said gear train including means whereby as said drive member unwinds said escapement is operated thereby while when said member is being wound up said escapement is unoperative thereby, heating means including a source of electrical energy and a resistance connected in a circuit with a switch, a manually movable operating member, and connections between said member, drive member and switch arranged and adapted whereby when the drive member is cold and the operating member is moved in one direction said switch is closed and said drive member is heated so that it unwinds and brings about opening of said switch and on moving said member subsequently said switch is closed and said drive member is wound.

RICHARD H. LEHDE.

REFERENCES CITED

The following references are of record in the file of this patent:

UNITED STATES PATENTS

| Number | Name | Date |
|--------|------|------|
| 1,795,013 | Denman | Mar. 3, 1931 |
| 2,036,178 | Lucia | Mar. 31, 1936 |
| 2,162,098 | McCabe | June 13, 1939 |
| 2,310,044 | Stevenson | Feb. 2, 1943 |